Figure 1:
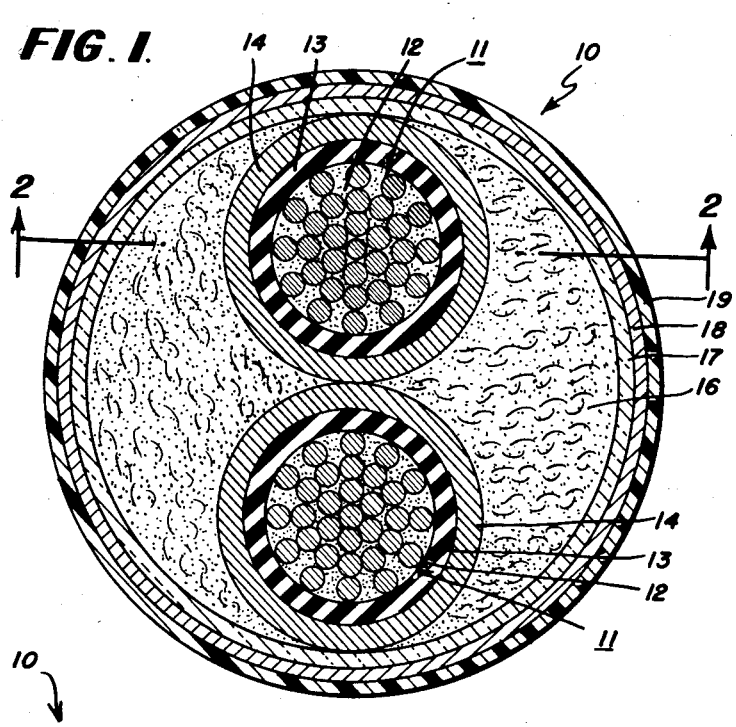

July 23, 1957  G. M. VAN LEAR  2,800,524
ELECTRIC CABLE
Filed July 8, 1953

INVENTOR
GLENWOOD M. VAN LEAR
BY
ATTORNEYS

2,800,524

ELECTRIC CABLE

Glenwood M. Van Lear, Alexandria, Va.

Application July 8, 1953, Serial No. 366,878

10 Claims. (Cl. 174—116)

(Granted under Title 35, U. S. Code (1952), sec. 266)

The invention described herein may be manufactured and used by or for the Government of the United States of America for governmental purposes without the payment of any royalties thereon or therefor.

This application is a continuation-in-part of application Serial No. 214,618, filed March 8, 1951, now abandoned.

This invention relates to electric cables, and more particularly to electric cables for resisting heat and flame.

Cables are used for many purposes and their designs vary considerably in size and number of conductors contained therein, in the character and thickness of their insulation, in the manner of their assembly or construction, in the protection provided by their outer coverings, and in other respects. For example, it is known to provide different cable designs for carrying power, signals communication, etc. Many have organic and inorganic dielectrics as insulation around their conductors. Generally, the insulated conductors of a cable are enclosed within a protective covering that is intended to protect the insulation from the effects of ambient air, moisture, oil and other factors that adversely affect the operability of the conductors.

In general, however, cables of the prior art, using an organic dielectric for insulation, are designed for normal operation at temperatures not exceeding about 110° C. For short periods of time, such as might occur under brief overloads, acceptable cables, using a combination of organic and inorganic materials for insulation, are permitted to reach temperatures of about 125° C. A prime object of this invention is to provide a general service cable comprising a unique combination of component materials having better physical and electrical characteristics than prior art cables, the new cable having new and improved characteristics permitting operation of the cable at temperatures up to the melting point of the common cable conductor materials.

A more specific object of the invention is to provide cables that have lesser diameters and weights than prior art cables of the same ratings.

Another object of the invention is to provide a general service cable that will remain operative for its intended use while the cable is being subjected to abnormally high temperatures such as might occur, for example, in a fire of limited intensity.

A further and important object of the invention is to provide a cable incorporating basic features to provide maximum heat and flame resistance.

A precise object of the invention is to provide an electric cable for use in fixed wireways such as are found, for example, in tunnels and on combatant vessels; the cable incorporating basic features for providing a minimum diameter and weight for its rating.

An overall object of the invention is to provide an electric cable of a "fireproof" type, by fireproof meaning capable of withstanding specified voltages for a satisfactory time without developing excessive current leakage under a recognized gas-flame test that evaluates cables with respect to their operability while exposed to fire. This gas-flame test includes the following procedure:

(a) The test-specimen shall be approximately four feet of a completed cable, the ends of the specimens being prepared for electrical testing.

(b) The apparatus shall comprise a test chamber having means for disposing of obnoxious gases resulting from the testing. The source of flame shall be a 24-inch ribbon type gas burner. One 3-phase or three single-phase 60-cycle transformers of not less than 3-ampere capacity at rated voltage shall be provided.

(c) For the test, the specimen shall be suspended horizontally within the test chamber so as to prevent sagging due to heat from the flame and to allow free circulation of convection air currents. The flame from the burner shall be adjusted to give a non-oxidizing, non-reducing, neutral flame approximately 2¼ inches high with a minimum air supply. The flame shall be centered beneath and parallel to the specimen so that the tip of the blue flame just touches the lower surface of the specimen. The potential transformers shall be connected to the specimen through a 3-ampere fuse in each phase and in the ground circuit. During the test rated voltage shall be continuously applied between conductors and between each conductor and ground which may be an outer metal covering.

(d) Failure is defined as blowing of a 3-ampere fuse.

The test produces temperatures of as much as 950° C. in the test specimen. This is above the melting point of conductors such as aluminum and just under the melting point of copper conductors. Hotter temperatures can be produced but the integrity of the circuit is limited under such conditions to the conductor, rather than the cable insulation, and also to the fixtures, connections, and the loading equipment such as motors, transformers, etc.

Except for magnesium oxide insulated, metal-sheathed cables such as shown in the British Patent 620,230, known prior-art cables undergoing this simulated fire test up to 950° C. will have inherent time-failures, depending on their construction and the materials used in the construction. However, the excepted cables differ considerably in the materials used for their manufacture, in cable characteristics such as flexibility, and number and size of conductors, and in susceptibility to atmospheric moisture, etc. Gas-flame tests as described have shown that prior-art cables generally fail electrically after being exposed about 2 to 40 minutes; and an important object of this invention is to provide an electric cable that can easily withstand the gas-flame test for many hours without failure.

A further object of the invention is to provide a fire and heat resistant cable of a type described which is flexible, by flexible meaning non-rigid and readily bendable into place solely by the human hands, and removable the same way, that is with bending after years of normal rated use.

Still another object of the invention is to provide an electric cable of a type described that will remain operative while in surroundings of abnormally high temperatures which are sufficient to cause physical and chemical changes in the materials used in the construction of the cable.

A further object of the invention is to provide an electric cable utilizable at abnormally high temperatures such as occur during a fire, the cable being made of materals that are either stable at the high temperatures or undergo changes at the high temperatures into end-products that retain desirable insulating and dielectric strengths and do not contaminate other components of the cable and are not themselves contaminated by decomposition products of such other components, so that the cable is not damaged by the high temperatures to a point of inoperability, and so that the heated cable while still in the fire continues to withstand rated voltage and performs normal functions.

Another object of the invention is to provide a fire-resistant cable of a type described capable of service where vibration is likely to occur, as for example, aboard ships and aircraft.

Figure 2:
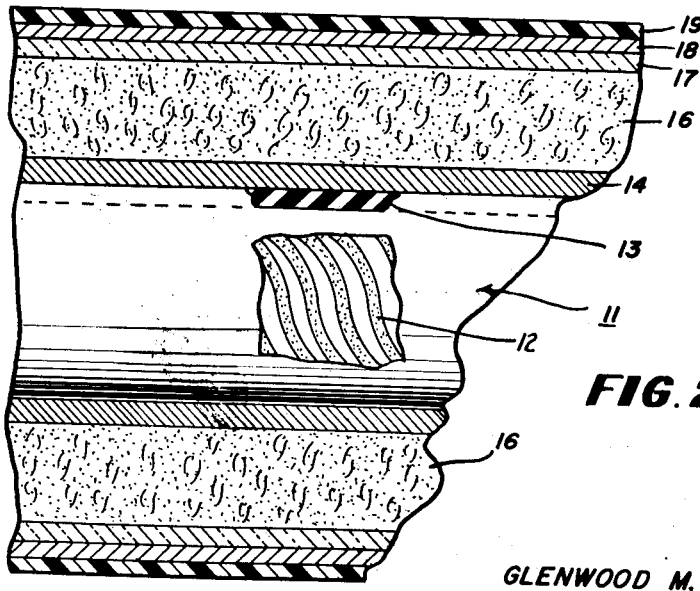

Objects and features of the invention, in addition to the foregoing, will be discernible from the following description of a preferred form thereof. This description is to be taken in conjunction with the accompanying drawings in which:

Fig. 1 is a transverse cross-sectional view of an illustrative cable embodying the invention; and Fig. 2 is a fragmentary longitudinal cross-sectional view, taken substantially on the line 2—2 of Fig. 1.

The drawings illustrate a cable embodying the principles of the invention, the cable being of indefinite length that can extend for a considerable distance. This representative cable is identified by the reference numeral 10, and comprises a pair of stranded conductors 11, strand sealing compound or filler 12, a wrapper comprising a dielectric or insulation wall 13 with or without an outer retaining covering 14, a filler 16, possibly a binder 17, and successive outer coverings comprising an inner metallic electric-shield 18 and an outer sheath 19.

In general the invention provides a flexible electric cable for any general use, the cable being impervious to water, oil, common solvents and the like, and water-tight so that it can be used in contact with water without the danger of moisture seeping into it or travelling along the inside of it, such moisture being particularly objectionable because at fire temperatures, it is in the form of disruptive high pressure steam. A cable in accordance with the invention is heat-resistant so that it can be used in hot areas such as confined spaces or engine rooms or where the possibility of fire exists, and is of greater current-carrying capacity and smaller size in comparison with prior-art cables of like use.

The invention can be applied in cables for different classes and the principles underlying the construction of a cable embodying the invention, including the materials used and their desirable properties, will be apparent from the following discussion of the parts and of the association of the parts in the specific cable illustrated.

*The conductor 11*

The conductor per se forms no essential feature of the invention, except as part of the cable. The conductor may be solid or stranded, but the latter is generally preferred, regardless of size, because of the relative susceptibility of solid conductors to vibration fatique failures in such services where vibration is encountered. The conductor may be made of any suitable metal. The common materials used are copper and aluminum although many other materials such as, for example, nickel, iron, clad metals, and other materials may be employed for special applications where a particular advantage of a certain material is needed for other characteristics. For shipboard use, to which the cable of this invention is especially applicable, low conductivity metals are generally undesirable as conductors because a larger conductor must be used resulting in the weight of the insulation and other coverings being greater; and the resultant cable will be large in diameter and heavier than a cable using copper conductors.

As to size of conductor, it may be informative to point out that a rough classification indicates that American Wire Gage sizes 19 and smaller are used for conductors in twisted-pair telephone cables; sizes 8-22 are used as conductors in multiple conductor communication and control cables; and sizes 16 and larger are used in lighting and power cables. The invention herein described contemplates cable constructions for all these categories.

*Strand sealing compound or filler 12*

It is desirable to fill the void spaces between strands of a conductor with a material that prevents the entrance of moisture, oil or other foreign matter that would damage the cable or interfere with its operation, especially if the cable becomes so hot as to volatilize or decompose such foreign matter, thereby, increasing the pressures in the cable or detracting from the insulating value of the enclosing dielectric. The stranded conductors in certain types of prior-art shipboard cable are filled with any one of six or more different compounds for the purpose of preventing the flow of water through the cable core by hose action. However, the problem of filling conductors in fireproof cable embodying the invention is different.

In accordance with the invention, besides being able to exclude foreign matter the strand sealing compounds should preferably meet the following requirements:

(a) Physical, electrical and chemical compatibility under all foreseeable conditions with the conductor and other component materials in the cable.

(b) Proper consistency to allow introduction during the stranding operation by gravity feed, pumping, or other simple means, or by immersion of the uninsulated stranded conductor, so as to fill all void spaces and exclude gases and liquids. Proper consistency and heat stability so that the cable will be flexible and not become hard and stiff at rated operating temperature or temporary overloads. Proper consistency to stay in place and not melt, migrate or drip from the cable ends during normal service or emergency overloads.

(c) Low coefficient of thermal expansion so as not to impose excessive internal pressure on the dielectric during normal service or emergency overloads.

(d) Physical and electrical properties such as to provide low electrical contact resistance with bolted, squeeze-on, or other mechanically applied connectors, without the need for removing the sealing compound by cleaning in the manner required for making soldered connections.

(e) Low organic content, low volatility, and inertness such that any decomposition products evolved at extremely high temperatures do not contaminate or detract from the dielectric strength of the insulation.

In furtherance of the invention preferred strand sealing compounds or fillers having the foregoing characteristics to a suitable extent have been provided and are hereinafter referred to as "water tight sealing compound or filler." A typical satisfactory compound consists essentially of a powdered asbestine base having the characteristics of a hydrated magnesium silicate to which is added a minimum amount of mineral grease and castor oil derivative, or an equivalent resin or silicone oil or grease content to give the desired plastic or pasty consistency. The inorganic fraction is approximately 60% or more by volume, and the ash shows on analysis:

| | Percent |
|---|---|
| Silica ($SiO_2$) | 44 |
| Magnesia ($MgO$) | 45 |
| Iron oxide ($Fe_2O_3$) | 6 |
| Alumina ($Al_2O_3$) | 4 |
| Calcium oxide ($CaO$) | 1 |

This filler compound is suitable for and has been used successfully in conductor sizes No. 8 AWG and larger conductors, but it is difficult to introduce into smaller stranded conductors. Smaller conductors can be filled with a silicone rubber or paste. Typical commercially available materials are exemplified by Dow-Corning No. 125, and General Electric No. SS-07. General Electric No. SS-07 consists of a silicone oil base which has been cooked down to a viscosity of about 2000 centistokes and mixed with equal parts of finely divided titanium dioxide powder to which mixture a curing agent, such as one percent of benzol peroxide, may be added but is not needed and generally is not used.

In any event, the filler compound 12 must be such that its decomposition products at high temperature will not contaminate the insulating characteristics of the overlying dielectric insulation material 13.

Theoretically, it is not imperative for operation of fireproof cable at extremely high temperatures that the interstices of the conductor always be filled with sealing or watertight filler compound when service conditions are such that water, oil or other foreign matter are not present and not liable to enter into the interior of the cable. Since the absence of such liquids or moisture of condensation can seldom be guaranteed, it is advisable and preferable to fill the voids of a stranded conductor of adequate size with filler compound.

The dielectric insulation wall 13

In fireproof cables, the insulation wall 13 per se need not be highly resistant to moisture, chemical solvents, or outside agents since other means are provided for excluding these agents; however, the insulation wall must be highly resistant to heat and must not carbonize, char or otherwise permit the formation of electrically conductive or low resistance leakage paths at extremely high temperatures. In addition, the dielectric insulation wall must be capable of withstanding rated voltage at extremely high temperatures so that the cable will still function, when very hot, for example at temperatures found in the test described.

The organosilaxanes (silicone) materials when used alone or in combination with mica flakes, asbestos fibers and/or glass fibers have shown a preferred performance as insulation over other numerous materials and combinations of materials tested in experimental cables. The type of silicone and supporting binder is varied with the cable type and size, as illustrated by the following preferred examples.

For smaller conductors No. 6 AWG and less, a compound comprising 30–35% silicone gum mixed with 70–65% of an inorganic mineral filler, such as titanium dioxide or diatomaceous earth, and small amounts of an inhibitor and curing agent is suitable as insulation for application by extrusion methods. The diatomaceous earth filler is preferred for the extrudable compounds on small conductors. A typical formulation for the compound consists of equal parts of silicon gum and diatomaceous earth, with about 1% of benzol peroxide.

Other silicone compounds now on the market are identified as Dow-Corning #172, #181, #250 and DCX-5158, and General Electric #81,271, #81,349, and #81,369. It has been found, however, that the long vulcanizing or curing time which is recommended for these compounds by the suppliers is not necessary in fireproof cables. In lieu of the 48 hours heat soak recommended by the suppliers, it has been discovered that a cure of 1 minute at 100 pounds per square inch steam pressure, or ½ minute at 220 pounds or equivalent, is sufficient to set up the compound for subsequent cable manufacturing operations. This "tender" cure or what would be considered an undercure for other applications is an advantage in fireproof cables in that service operation and overloads up to 230 C. serve merely to cure the insulation to its optimum condition and do not introduce any deleterious or aging effects. For conductor sizes No. 8 AWG and larger, because of present manufacturing limitations the preferred dielectric is not in the form of the above described extruded tube but preferably comprises multiple layers applied in the form of tapes.

The dielectric for the larger conductors of 8 AWG and above comprises one or more layers of one or more suitable insulation tapes. Tapes have been developed for this purpose and they may be employed alone or in combination to suit the size and voltage rating of the cable. One such tape comprises chrysotile asbestos of low iron content, treated with silicone varnish or silastic rubber. Another such tape comprises heat-cleaned woven glass fibers treated with silicone varnish or silicone rubber.

Another utilizable tape which has been developed for these cables is the above described glass fiber tape to which is bonded an overlapping layer of #2 mica splittings.

There is some choice in the proportions of mica, glass and asbestos comprising the insulating tapes; in fact, the mica is not essential at all, and cables insulated with silicone treated glass tapes alone or silicone treated asbestos tapes alone will not fail at extremely high temperatures. However a plurality of layers of filled and coated glass tapes is preferred as providing the best balance of ruggedness against damage by bending and impact and of electrical properties, such as insulation resistance, power factor, capacitance and dielectric strength.

A typical dielectric insulation wall 13 may comprise, in view of an average conductor size and an assumed operating potential of 450 volts, at least three or more, and preferably six, coated tapes arranged in suitable sequence, as for example, (a) one or more coated asbestos tapes plus one coated glass-mica tape, plus one or more coated glass tapes, or (b) one or more coated asbestos tapes, plus two or more coated glass tapes, or (c) one or more silicone rubber coated glass tapes plus two or more silicone-varnished glass tapes, or (d) alternating layers of coated asbestos and glass tapes, the total wall thickness being about 40 to 60 mils. Experimentally, an insulating wall comprising two inner layers of silicone rubber coated glass tape and four outer layers of silicone varnished glass tape has been found exceptionally satisfactory for large size cable, also, six layers of silicone rubber coated glass tape has been successfully tried on large size cable. Preferably the tapes should be all wound in the same direction, with no overlap in the turns of each layer. However, the layers are staggered so as to avoid registration. These preferred combinations and other combinations have and will secure the desired cable characteristics at extremely high temperatures, provided there is no outside influence or contamination from other components.

The retaining covering 14

Each smaller conductor which is covered with an extruded tube as its dielectric insulation wall 13 must be enclosed within a relatively thin ash retaining covering identified by the numeral 14 in the drawings. This covering is of felted asbestos fibers or of one or more closely-woven glass fiber braids or wraps capable of retaining a powdery ash to which the silicone compound comprising the extruded tube is converted by extremely high temperatures. The asbestos or glass fibers used for the covering 14 should be treated with a minimum amount of a compatible silicone lacquer or varnish as a binder to prevent fraying of their cut ends incident to handling and installation. Such binders are known to the art and are made by many manufacturers. They may be Dow-Corning Nos. 993, 966 or 803, or Interchemical Nos. 1772A and 2778. The composition of Interchemical 1772A is an ethyl cellulose base resin in a vehicle of isopropyl ether, toluene or methyl alcohol having a boiling range of 56 to 74 C. which should be applied to the glass braid and dried promptly to a tack free condition.

For larger conductors, 8 AWG and over, an outer retaining wall 14 is not required, successive ash-retaining barriers being provided by the base material of asbestos or glass of the successive layers of tapes forming the dielectric insulation walls of such larger conductors.

The filler 16

Fillers are commonly employed in cables of a type having two or more conductors, the filler being used to fill the spaces or valleys between the insulated conductors so as to provide a firm, well-rounded cross-section. The filler is added during the cable-making operations. In commercial cables, fillers are considered of little or no importance in normal functioning of the cable. In fireproof cable, the fillers are of a primary importance since all of the component materials must be compatible at extremely high temperatures. Fillers of cotton, paper or jute are not satisfactory. Fillers of asbestos or glass roving when saturated with hydrocarbon compounds are unsatisfactory.

The preferred filler for the smaller fireproof cables with extruded insulation is the previously-described filler compound 12 alone, or the filler compound in conjunction with asbestos or glass fibers.

The preferred filler for large fireproof cable with taped insulation consists of a plastic or pasty filler portion, and a fibrous portion for the relatively larger cables. Up to 14 AWG, the fibrous portion can be omitted; and in larger sizes the fibrous portion increases to as much as 50% or above of the total filler for largest size cables in order to provide a firm, well-rounded cross-section in which a pasty material, by itself, will not provide.

The pasty filler portion is a material like the strand sealing compound 12.

The fibrous portion preferably comprises asbestos or glass fibers, or both, pretreated with silicone resin, or a minimum amount of organic base compounds which will not affect the fire resistance and use of the cables. When an organic base compound is used, it should not be more than about 5% of the weight of the filler 16, and preferably much less can be used.

In general the filler must not contain or absorb excessive moisture, and it must not contain materials which at extremely high temperatures will release sufficient amounts of harmful decomposition products to lower the dielectric strength of the insulation in the completed cable.

The protective coverings

Basically, the protective coverings 17, 18 and 19 are of lesser importance, being externally applied when the conductors, the strand sealing compounds, the dielectric insulation and the fillers are properly assembled.

(a) *Binder 17.*—The assembly of insulated conductors and filler may be wrapped with a suitable binder, such as binder 17, to hold the cable core in shape for subsequent manufacturing operations, but such a binder is not required as a basic component of fireproof cable. The binder is, however, usually used for manufacturing reasons, and may be glass or asbestos fibers applied as a tape or roving. A suitable binder that has been found satisfactory is Raybestos-Manhattan #9363 with or without a cellulose acetate butyrate tape, or Chase and Sons #216 which consists of a laminated tape construction consisting of two plies of 0.004-inch thick short-fiber asbestos paper, the asbestos containing not more than three percent total iron content and not more than eight percent of organic material, saturated with polyvinyl acetate between which are positioned longitudinally and spaced evenly apart about 16 ends per inch of 150–1/0 glass fiber yarn, the whole being adhered together by applying to the inner asbestos tape surfaces a synthetic rubber base adhesive compounded of Buna-S rubber, hydrogenated ester gums, zinc oxide and titanium to form a composite tape having a tensile strength of not less than 75 pounds per inch of width.

(b) *Sheath 19.*—The insulated conductors and filler comprising the cable core must be enclosed in an impervious sheath to exclude foreign elements such as moisture, water, oil, acid, or alkalis, the entrance of which might damage in some degree the ability of the cable to operate normally, or under overload conditions, or during a fire. The material comprising a sheath such as sheath 19 may be a continuous tube of metal such as lead, lead-alloy or aluminum, or may be a non-metallic compound of a synthetic rubber-like type such as that based on commercial polyvinyl chlorides such as, for example, Geon or Vinylite, or polychloroprene such as, for example, neoprene. Polychloroprene material is preferred for power cables having conductor sizes No. 8 AWG and above, but vinylite compounds such as Bakelite #59,991 which do not contain migratory plasiticizers, such as tricresyl phosphate or dioctyl phthalate are acceptable on smaller sizes. Bakelite No. 59,991 sheath is a plasticized vinyl chloride resin consisting of 95 percent vinyl chloride polymerized with five percent vinyl acetate and this copolymer comprising 41 percent of the compound is mixed with two percent carbon black and 28 percent inert clay filler and plasticized with one percent tricresyl phosphate and 27 percent adipate ester such as dioctyl phthalate. The art of compounding such materials and the processes of applying them to a cable core are well known. Compounds of natural rubber are inferior because of relatively poor resistance to heat, oil, flame, and weathering. The sheath 19 is shown in the drawing as non-metallic.

(c) *Shield 18.*—Unless the above sheath is metal, an electrostatic shield, such as shield 18, may be desired to reduce inductive interference between paralleling circuits. Such a shield may be applied in the form of a metal foil or tape, or as a wrap or braid of metal wires, either under or over the impervious sheath.

The binder and shield may be desirable for certain cable constructions or functions but neither is essential to the performance of the fireproof cable.

Under operating and emergency overload conditions of commercial cable, the advantages of fireproof cable in accordance with the invention are not readily apparent, except by abnormally long service life. Fireproof cable of the present invention is desirable where low size and weight are required or where it is desirable to have a cable that withstands high temperatures and abnormal conditions.

The principal advantage of the novel fireproof cable is readily apparent when it is subjected to extremely high temperatures. A fireproof cable as herein described will operate continuously and have long life at sustained conductor temperatures exceeding 125 C. No signs of distress will be exhibited at conductor temperatures up to 250 C., unless the distress is in an improperly chosen protective covering. With a suitable sheath the fireproof insulated conductors and cable core are capable of operating continuously at 250 C. Therefore, at a temperature of 125 C. which is the maximum or somewhat greater than that at which conductor heating or losses become appreciable in relation to the delivered energy, the principal advantage of fireproof cable is in the safe overload or emergency rating up to 250 C. for periods of 24 hours or more, a factor of safety which previous designs do not possess.

The fireproof cables embodied in this invention will withstand the gas-flame test at 950° C. for 10 hours or more without failure. Generally, these fireproof cables will evolve some smoke for about 20 minutes while the organic materials in the protective coverings are being consumed, but then the smoke diminishes and stops. The fireproof cables may be exposed in the flame for hours without visible signs of stress. Thus, the fireproof cables assure a continuous supply of power and continuous control, signal and communication service during the critical and emergency periods of an actual fire. Since the upper limiting temperature for cable failure is the melting point of the conductor material, copper is generally preferred over aluminum.

Reactions during the gas-flame test or an actual fire are complicated. Basically, the dielectric silicone insulation 13 under the test or similar heat turns to a very fine white powder that is an excellent insulator which does not char or carbonize. In the smaller conductors, the ash of the extruded silicone is retained like a bag of sand by the felted asbestos or glass braid of the ash retaining covering 14. For such covering, the glass braid, however, must be closely woven so as to confine the fine powder. Preferably, the glass braid should have an angle of 50 to 60 degrees with the conductor axis, and a weave equivalent to 150–1/0 or 225–1/2 fibers, 16 carriers, 2 ends and 30 to 35 picks per inch. Even so, the powdered insulating silicone ash must be retained and must not be contaminated by decomposition products from other component materials. In the larger cables with tape insulation 13, the successive layers of asbestos or glass retain the ash of the burned silicone insulation so that the shape of the conductor unit remains intact.

Under fire, a filler 16 with and without a fibrous portion, is of particular advantage in that its decomposition ash-product has considerable body, being of an interconnected cellular structure somewhat similar in appearance to porous concrete, after baking, which is dry and stiff. This body has sufficient strength to maintain the original physical spacing between the conductors and between conductors and any outer covering; and it prevents collapse of the conductor arrangement and dielectric failure between conductors. Consequently, even though the body is brittle after a fire, the improved fireproof cable can remain in service temporarily until it is replaced at a convenient time.

Another important advantage of the fireproof cable design resides in the fact that the dielectric insulation wall 13 does not char at any point of dielectric failure and a carbonized path of low resistance is not formed at such a point of rupture. The same specimen can be broken down ten or more times at approximately the same high potential, and subsequent punctures occur frequently at a new point rather than at the point of prior ruptures. Thus a new cable characteristic is provided, in that the cable is not damaged by accidental application of overpotential, high peak voltages of transients and switching surges, or voltages induced from parallel circuits.

By the employment of superior heat resistant insulation and the selection of component materials which are not harmfully incompatible at extremely high temperatures, as taught by this invention, it is possible to produce cables of reduced diameter and weight that can be used at much higher temperatures than prior cables. This is important in numerous applications, for instance, in shipboard cables where the reduction has been about 20% in weight and 35% in space, and the cables are serviceable during and after a fire. The reduction also results in less inductance and less voltage drop from source to load. This results in a higher current rating for fireproof cables as compared to known designs where the rating would otherwise be based on maximum temperature rating.

A particularly useful cable for power purposes built in accordance with the invention comprises a three-conductor cable, constructed as follows:

*First.*—A stranded copper conductor comprising 61 No. 16 AWG bare copper wires stranded concentrically with a helical pitch in the outer layer of not more than 7½ inches and with all interstices between the wires filled with non-metallic compound consisting of 65 parts of inorganic material such as of asbestine and silica flour in 35 parts of vehicle such as non-drying castor oil derivative or polymeric vinyl resin.

*Second.*—A dielectric on each conductor built up of six ¾ inch wide silicone treated glass tapes, each tape woven of 450–1/2 glass yarn with 60 warp and 58 woof ends per inch, the first tape adjacent to the conductor and the second tape being pretreated to 0.010 inch total thickness with silicone rubber and the four outer tapes being pretreated to the same thickness with silicone varnish, all tapes being applied helically with a butt lap or a slight open space between edges of successive turns of a tape so as to avoid overlap of the edges of that tape, the helix of successive tapes being advanced by ¼ inch so that the open convolutions will not lie directly over the open convolution of the underlying tape, with a slipper or lubricating compound such as silicone oil of 200,000 centistokes viscosity loaded with finely powdered mica inserted between varnished tapes while the tapes are being applied so as to allow free relative sliding of the tapes on each other when the conductor or completed cable is bent during subsequent manufacturing operations or during installation.

*Third.*—Three such insulated conductors twisted together with a uniform lay not exceeding 16 inches, the center interstice being filled with sealing compound like that employed in the stranded conductor, the volume of the three large outer valleys or spaces within a circle circumscribing the three insulated conductors being filled fifty percent or more with multiple ends of asbestos roving containing not more than six percent total iron and not more than 15 percent organic material presaturated with 15 percent by weight of ethyl cellulose or multiple ends of glass yarn or yarn made of similar asbestos and glass fibers in combination and pretreated in the same manner the other 50 percent or less of the space being filled with sealing compound like that employed in the stranded conductor, the amount of filler material being such as to fill all voids and provide a firm well rounded cross section to the cable core.

*Fourth.*—A binder consisting of one Chase & Sons No. 216 tape as previously described, two inches wide by ten mils thick, applied helically with ¾ inch overlap so as to retain the filler material and circular section of the assembly.

*Fifth.*—An impervious sheath extruded as a tube with a wall thickness not less than 60 mils over the core, the sheath being either (1) a vulcanized compound comprising 63 percent polychloroprene, 18 percent carbon black, six percent of clay and oxides of antimony and magnesium, and 13 percent acetone extractable fatty acid esters, inhibiters and curing agents or (2) a thermoplastic compound comprising 28 percent polyvinyl chloride resin, 30 percent carbon black, 17 percent of clay, calcium carbonate and lead oxide, two percent fatty acid esters, 16 percent tricresyl phosphate and seven percent sebacate ester plasticizers.

*Sixth.*—A braided metal wire armor woven with 0.0126-inch diameter aluminum alloy wire on a 24 carrier braider with not more than 10 wires per carrier applied at an angle of 45 to 70 degrees so as to provide at least 88 percent coverage.

*Seventh.*—A finishing coat of aluminum paint consisting of commercially pure aluminum pigment in the form of fine flakes with a volatile paint thinner and a suitable fatty lubricant to form a thick paste which is put into a vehicle of the synthetic resinous, phenolformaldehyde or glyceride, type designed for use on shipboard cables.

A representative useful size of control or communication cable built in accordance with the invention comprises a ten-conductor cable constructed as follows:

*First.*—A stranded copper conductor comprising 7 No. 26 AWG bare copper wires stranded concentrically with one wire forming the central core and six wires laid around the central wire with a helical pitch of ¾ inch and with all interstices between the wires filled with non-metallic compound consisting of silicone oil cooked and polymerized to a viscosity of 200 centistokes and mixed with finely divided titanium dioxide powder, the compound preferably not containing the usual small percentage of benzol peroxide curing agent.

*Second.*—A dielectric insulation on each conductor comprising an extruded tube of silicone rubber compound, the compound containing approximately 100 parts each of silicone rubber gum and finely divided diatomaceous earth or silicone soot and 2½ parts of benzol peroxide, to a diameter over the dielectric not exceeding 0.105 inch, the dielectric being vulcanized or cured under conditions equivalent to 200 pounds per square inch steam pressure for 30 seconds so as to impart the necessary physical and electrical properties.

*Third.*—A closely woven glass fiber braid over the dielectric on each conductor, woven on a 16 carrier braider with 150–1/0 glass yarn on each carrier at an angle closely approximating 54 degrees and with about 32 picks per inch, the weave being controlled closely so as not to result in dielectric failure in the test flame, and the braid being treated to prevent fraying at cut ends by coating with silicone varnish or ethyl cellulose base lacquer thinned with high solvent naptha which is dried to a tack-free finish.

*Fourth.*—Two such conductors twisted together with a right hand lay not exceeding two inches and the other eight conductors laid around the central two conductors with a left hand helical pitch of 4½ inches, all interstices between insulated conductors being filled with compound similar to that employed in filling the copper conductors of power cable to provide a firm well rounded core section.

*Fifth.*—A binder over the core comprising a one-inch wide tape of one-mil thick polyethylene terephthalate film or two-mil thick cellulose acetate butyrate film applied helically with overlap plus a one-inch wide by 10-mil thick tape comprising 30 to 35 percent of non-ferrous asbestos fibers intermingled and dispered at random with 60 to 65 percent of fine glass fibers, the tape being pre-saturated with 40 to 45 percent by weight of polyvinyl acetate plasticized with polymeric resin, applied helically with 3/16-inch overlap.

*Sixth.*—An impervious sheath, extruded as a tube with a wall thickness not less than 50 mils over the binder, comprising a compound of 42 parts vinyl chloride polymerized with 2 parts vinyl acetate, one part carbon black, 29 parts inert clay and calcium carbonate, 9 parts vegetable fatty acid esters, and 18 parts dioctyl phthalate plasticizer.

*Seventh.*—A braided metal wire armor woven with 0.0126-inch diameter aluminum alloy wire on a 24 carrier braider with five wires per carrier applied at an angle of 40 to 60 degrees so as to provide at least 88 percent coverage.

*Eighth.*—A finishing coat of aluminum paint similar to that employed on the power cable.

It should be understood that the foregoing disclosure relates to only preferred embodiments of the invention and that it is intended to cover all changes and modifications of the examples of the invention herein chosen which do not constitute departures from the spirit and scope of the invention as set forth in the appended claims.

It is claimed:

1. An electrical cable for sustained operation at temperatures of approximately 250° C., comprising at least one conductor, said conductor including a plurality of strands, insulating material separating said strands, said material including a combination of silica and magnesia held together by a binder of mineral grease, an ash retaining wall around said strands comprising a mixture of silicone materials and glass fibers capable of retaining ash at said temperatures, an outer sheath surrounding said conductor, and a pasty mineral filler between said sheath and retaining wall, said mineral filler including a mixture of said insulating material in combination with glass fibers.

2. A cable as defined in claim 1 but further characterized by said conductor having a size less than 8 AWG, and said ash retaining wall being extruded.

3. A cable as defined in claim 1 but further characterized by said conductor having a size of at least 8 AWG, and said ash retaining wall being helically wound tape.

4. A cable as defined in claim 3 but further characterized by said tape forming an angle of approximately 50 degrees with said conductor.

5. A heat-resistant electric cable comprising a plurality of conductors, each conductor being 6 AWG or less; an extruded tube about each conductor; said tube being a dielectric consisting of about 100 parts of silicone rubber gum, about 200 parts of a material selected from the class consisting of titanium dioxide and diatomaceous earth, and about 2½ parts of benzol peroxide, said tube being partially cured; a closely woven glass fiber braid covering over each tube; an outer covering for said cable and containing said conductors, and a filler filling the remaining space inside said outer covering, said filler comprising at least about fifty percent of a material chosen from the class consisting of asbestos of low iron content and glass fibers, and a material in the form of a non-metallic compound consisting essentially of at least about sixty percent asbestine and silica flour and a vehicle selected from the class consisting of a non-drying castor oil derivative and a polymeric vinyl resin.

6. A heat-resistant electric cable comprising a plurality of conductors, each conductor comprising a plurality of strands, a dielectric wall about each conductor, said wall comprising a mixture of silicon materials and fibers chosen from the class of asbestos fibers and glass fibers, an outer covering about said conductors, and a pasty filler filling the space inside said covering not occupied by said conductors and dielectric walls, said pasty filler comprising at least about fifty percent of asbestos roving, about thirty percent of asbestine and silica flour, and the remainder a minimum of a binder for said asbestine and silica flour to make a paste.

7. An electric cable as defined in claim 6 but further characterized by each of said conductors being at least 8 AWG, and a filler compound in the voids of each conductor inside the associated dielectric wall, said filler compound comprising at least about fifty percent of a material chosen from the class consisting of asbestos of low iron content and glass fibers, and a material in the form of a non-metallic compound consisting essentially of at least about sixty percent asbestine and silica flour and a vehicle selected from the class consisting of a non-drying castor oil derivative and a polymeric vinyl resin.

8. An electric cable as defined in claim 6 wherein said wall comprises a plurality of layers of tape.

9. An electric cable as defined in claim 6 but further characterized by each of said conductors being not over 6 AWG, said wall being an extruded tube, and an ash-retaining covering about said tube, comprising closely-woven fibers chosen from the class consisting of asbestos and glass.

10. An electric cable as defined in claim 9 wherein said ash-retaining covering comprises a tape helically wound about said conductor at an angle of approximately 50 degrees with respect thereto.

References Cited in the file of this patent

UNITED STATES PATENTS

| | | |
|---|---|---|
| 2,427,507 | Powell et al. | Sept. 16, 1947 |
| 2,459,653 | Keyes | Jan. 18, 1949 |
| 2,469,099 | Andrus | May 3, 1949 |
| 2,557,928 | Atkinson | June 26, 1951 |

FOREIGN PATENTS

| | | |
|---|---|---|
| 620,230 | Great Britain | Mar. 22, 1949 |
| 622,413 | Great Britain | May 2, 1949 |